E. M. CRANDAL.
Fence-Wire Stretcher.
No. 217,200. Patented July 8, 1879.
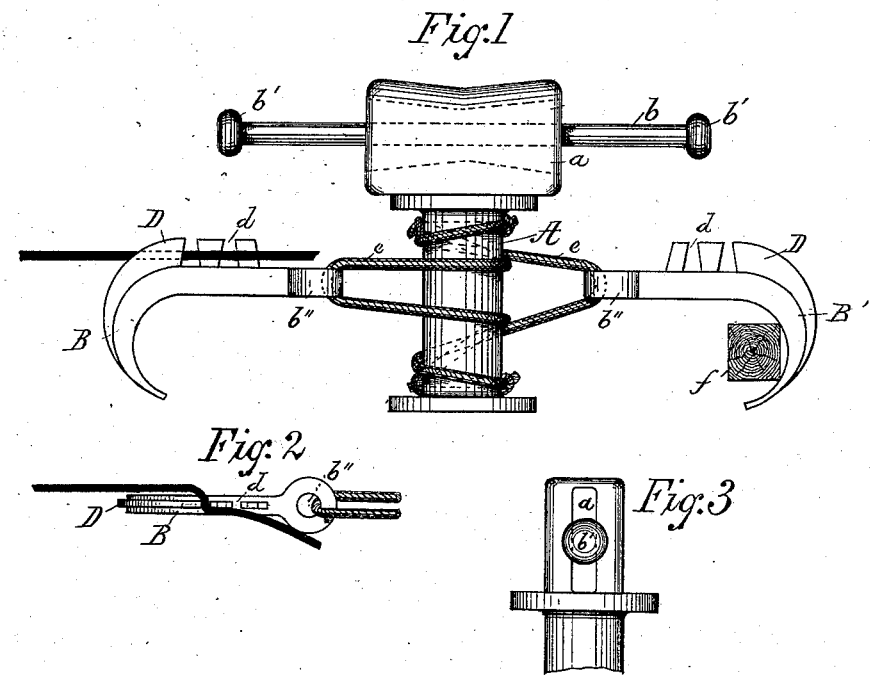

UNITED STATES PATENT OFFICE.

EDWARD M. CRANDAL, OF CHICAGO, ILLINOIS.

IMPROVEMENT IN FENCE-WIRE STRETCHERS.

Specification forming part of Letters Patent No. 217,200, dated July 8, 1879; application filed June 6, 1879.

*To all whom it may concern:*

Be it known that I, EDWARD M. CRANDAL, of Chicago, in the county of Cook and State of Illinois, have invented certain new and useful Improvements in Fence-Wire Stretchers; and I do hereby declare the following to be a full, clear, and exact description of the invention, which will enable others skilled in the art to which my invention appertains to make and use the same, reference being had to the accompanying drawings, which form a part of this specification, and in which—

Figure 1 represents a side view of a fence-wire stretcher embodying my invention. Fig. 2 represents a top view of one of the hooks and a portion of fence-wire as held firmly by frictional contact with wedge-shaped flanges. Fig. 3 represents an end view of the upper portion of the windlass, showing the enlarged socket.

Like letters of reference indicate like parts.

The object of my invention is to provide a simple and cheap device for stretching fence-wires; and my invention consists in the construction and arrangement of the device, as hereinafter described and claimed.

In the drawings, A represents a windlass having an enlarged central opening or socket, $a$, through the top thereof, and provided with a crank or lever, $b$, having knob $b'$ at each end thereof, all of which is made of cast or wrought iron, and of any desired dimensions.

B B' represent hooks, also made of cast or wrought iron, the forward ends of which are curved, and the rear ends are provided with openings or eyes $b''$, as shown. From the upper side of each of said hooks projects a wedge-shaped flange, D, in which are formed one or more dovetail slots or openings, $d$, of a size to admit the ordinary fence-wire. Through the eye $b''$ of each of said hooks is passed a rope, $e$, the ends of which are securely fastened in any suitable manner to the windlass A, as shown.

In using my said device one of said hooks B' is hooked around and so as to clasp one of the posts $f$ of a fence, and the fence-wire to be stretched is passed into one of the slots $d$ of the hook B, and is firmly held in position by frictional contact therewith. The windlass A is then turned or rotated in the desired direction by means of the crank or lever $b$, thereby winding the ropes about or around the body of the windlass, and drawing the hook B, and consequently the wire attached therein and thereto, toward the post $f$, and until the desired tension of the wire is produced, when one end of the crank or lever is passed under the rope, and acts as a catch-lever to prevent the windlass from unwinding or turning backward, and so as to secure the tension of the wire, when the wire is fastened to the posts by means of staples in the usual manner.

When it is desired to connect or splice the ends of two wires together, the ends of such wires are respectively passed into the slots $d$ of the hooks B B', and are then drawn toward and past each other, and are then tied or united in the usual manner; or the said ends are held in position until a piece of wire is spliced or united thereto.

It will be observed that the opening $a$ in the top of the windlass is enlarged vertically, so as to permit of the crank or lever $b$ having a free longitudinal movement therein, and of being arranged therein at an angle, so that one of the knob ends thereof may be passed under the rope, as and for the purpose specified.

Having thus described my invention, what I claim as new, and desire to secure by Letters Patent, is—

1. The windlass A, provided with the enlarged socket $a$ and crank or lever $b$, having a knob, $b'$, at each end thereof, substantially as and for the purpose specified.

2. The combination of the windlass A with the ropes $e$ and hooks B B', provided with the dovetail slots $d$, substantially as and for the purpose specified.

EDWARD M. CRANDAL.

Witnesses:
G. R. HOFFMAN,
N. COWLES.